US012469306B2

(12) United States Patent
Tofukuji et al.

(10) Patent No.: US 12,469,306 B2
(45) Date of Patent: Nov. 11, 2025

(54) MANAGEMENT SYSTEM, MAP GENERATION SYSTEM, AND NON-TRANSITORY COMPUTER-READABLE RECORDING MEDIUM

(71) Applicant: TOYOTA JIDOSHA KABUSHIKI KAISHA, Toyota (JP)

(72) Inventors: Satoko Tofukuji, Tokyo-to (JP); Daisuke Akihisa, Shizuoka-ken (JP); Ken Shinozaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 18/174,845

(22) Filed: Feb. 27, 2023

(65) Prior Publication Data

US 2023/0316774 A1    Oct. 5, 2023

(30) Foreign Application Priority Data

Mar. 29, 2022   (JP) ................. 2022-054014

(51) Int. Cl.
*G01C 21/00* (2006.01)
*G06T 17/00* (2006.01)
(Continued)

(52) U.S. Cl.
CPC ......... *G06V 20/58* (2022.01); *G01C 21/3837* (2020.08); *G06T 17/00* (2013.01); *G06V 20/70* (2022.01)

(58) Field of Classification Search
CPC ...... G06V 20/58; G06V 20/70; G06V 20/582; G06V 20/584; G06V 20/588;
(Continued)

(56) References Cited

U.S. PATENT DOCUMENTS 10,458,810 B2 * 10/2019 Fasola ................ G01C 21/3407
11,597,404 B2 *  3/2023 Fish ........................ G06V 20/58
(Continued)

FOREIGN PATENT DOCUMENTS

| JP | 2003-337040 A | 11/2003 |
| JP | 2005-044224 A | 2/2005 |
| JP | 2012-208111 A | 10/2012 |

*Primary Examiner* — Chineyere Wills-Burns
*Assistant Examiner* — Lucius Cameron Gree Allen
(74) *Attorney, Agent, or Firm* — Sughrue Mion, PLLC

(57) ABSTRACT

A management system manages an environment of a predetermined area. In the predetermined area, there are a recognition sensor configured to recognize a surrounding situation and a recognition target to be recognized by the recognition sensor present at a specific position. Three-dimensional map data of the predetermined area include specific space information indicating a specific space that is a space between the specific position and the recognition target. Recognition result information indicates a result of recognition by the recognition sensor present at the specific position. The management system determines whether an object not included in the specific space in the three-dimensional map data is included in the specific space in the recognition result information. The management system detects, as a removal target, the object not included in the specific space in the three-dimensional map data but is included in the specific space in the recognition result information.

12 Claims, 16 Drawing Sheets

(51) Int. Cl.
*G06V 20/56* (2022.01)
*G06V 20/58* (2022.01)
*G06V 20/70* (2022.01)

(58) Field of Classification Search
CPC ............ G01C 21/3837; G01C 21/3848; G01C 21/3859; G01C 21/3844; G01C 21/3811; G06T 17/00
USPC .......................................................... 382/104
See application file for complete search history.

(56) References Cited

U.S. PATENT DOCUMENTS

| | | | |
|---|---|---|---|
| 2012/0327238 A1* | 12/2012 | Satoh | B60R 1/27 348/148 |
| 2016/0305785 A1* | 10/2016 | Nishijima | G01C 7/04 |
| 2017/0323179 A1* | 11/2017 | Vallespi-Gonzalez | G06V 20/58 |
| 2018/0218227 A1* | 8/2018 | Takaki | B60W 30/0956 |
| 2020/0333789 A1* | 10/2020 | Suzuki | G05D 1/0212 |
| 2021/0078173 A1* | 3/2021 | Zhou | B25J 9/1666 |
| 2021/0191397 A1* | 6/2021 | Lin | B60W 60/001 |
| 2021/0233286 A1* | 7/2021 | Yasukawa | G06T 15/08 |
| 2021/0318121 A1* | 10/2021 | Laroche | G01C 11/025 |
| 2021/0341930 A1* | 11/2021 | Lin | G06V 20/58 |
| 2023/0069475 A1* | 3/2023 | Porter | G05D 1/2462 |

* cited by examiner

MANAGEMENT SYSTEM, MAP GENERATION SYSTEM, AND NON-TRANSITORY COMPUTER-READABLE RECORDING MEDIUM

CROSS-REFERENCE TO RELATED APPLICATION

This application claims priority to Japanese Patent Application No. 2022-054014 filed on Mar. 29, 2022, the entire contents of which are incorporated by reference herein.

BACKGROUND

Technical Field

The present disclosure relates to a technique useful for managing an environment of a predetermined area. The present disclosure also relates to three-dimensional map data of a predetermined area and a technique for generating the three-dimensional map data.

Background Art

Patent Literature 1 discloses a method for creating a three-dimensional digital map. An object arrangement data holding means holds object arrangement data representing an absolute arrangement configuration of objects. A three-dimensional digital map generating means sets a virtual field of view and retrieves object arrangement data corresponding to the virtual field of view from the object arrangement data holding means. Then, the three-dimensional digital map generating means generates the three-dimensional digital map by modeling the objects represented by the retrieved object arrangement data into a three-dimensional shape.

Patent Literature 2 discloses a method of displaying three-dimensional map in a navigation device. The method displays the three-dimensional map and zooms in details of traffic signs on a guidance route.

Patent Literature 3 discloses a technique for displaying information based on an image captured from a moving body. When a target object such as a traffic signal is hidden by an obstacle, the image is processed so that the target object becomes visible passing through the obstacle.

LIST OF RELATED ART

Patent Literature 1: Japanese Laid-Open Patent Application No. JP-2005-044224
Patent Literature 2: Japanese Laid-Open Patent Application No. JP-2003-337040
Patent Literature 3: Japanese Laid-Open Patent Application No. JP-2012-208111

SUMMARY

A recognition process that recognizes a recognition target by using a recognition sensor (for example, a camera) recognizing a surrounding situation is considered. For example, an autonomous driving vehicle uses an in-vehicle recognition sensor to recognize a recognition target such as a traffic signal, a sign, and a crosswalk. In such the recognition process, a surrounding environment is important. For example, in a case where there is an obstacle (for example, grown branches and leaves) in a space between the recognition target and the recognition sensor, the recognition process may be inhibited and thus accuracy of recognition of the recognition target may be decreased. In order to ensure a favorable environment for the recognition process, it is necessary to detect and remove (exclude) such the obstacle.

However, it is generally not easy to determine which object is the obstacle that actually inhibits the recognition process. It is inefficient to remove (exclude) an irrelevant object that does not actually affect the recognition process. It is desirable to more efficiently ensure a favorable environment for the recognition process.

An object of the present disclosure is to provide a technique that can efficiently ensure a favorable environment for a recognition process using a recognition sensor.

A first aspect is directed to a management system for managing an environment of a predetermined area.

The management system includes:
one or more processors; and
one or more memory devices configured to store three-dimensional map data of the predetermined area.

In the predetermined area, there are a recognition sensor configured to recognize a surrounding situation and a recognition target to be recognized by the recognition sensor present at a specific position.

The three-dimensional map data include specific space information indicating a specific space that is a space between the specific position and the recognition target.

The one or more processors acquire recognition result information indicating a result of recognition by the recognition sensor present at the specific position.

The one or more processors determine whether or not an object that is not included in the specific space in the three-dimensional map data is included in the specific space in the recognition result information.

The one or more processors detect, as a removal target, the object that is not included in the specific space in the three-dimensional map data but is included in the specific space in the recognition result information.

A second aspect is directed to a map generation system for generating three-dimensional map data of a predetermined area.

The map generation system includes:
one or more processors; and
one or more memory devices configured to store semantic model information indicating attribute information of each of components constituting the predetermined area.

In the predetermined area, there are a recognition sensor configured to recognize a surrounding situation and a recognition target to be recognized by the recognition sensor present at a specific position.

The one or more processors define the recognition target as one of the components in the semantic model information.

The one or more processors define the specific position as one of the components in the semantic model information.

The one or more processors define a specific space, which is a space between the specific position and the recognition target, as one of the components in the semantic model information based on the recognition target and the specific position.

The one or more processors generate the three-dimensional map data including specific space information indicating the specific space based on the semantic model information in which the specific space is defined.

A third aspect is directed to three-dimensional map data of a predetermined area.

In the predetermined area, there are a recognition sensor configured to recognize a surrounding situation and a recognition target to be recognized by the recognition sensor present at a specific position.

The three-dimensional map data have a data structure including specific space information indicating a specific space that is a space between the specific position and the recognition target.

Recognition result information indicates a result of recognition by the recognition sensor present at the specific position.

The three-dimensional map data are read by a management system that manages an environment of the predetermined area.

Whether or not an object that is not included in the specific space in the three-dimensional map data is included in the specific space in the recognition result information is determined by the management system.

The object that is not included in the specific space in the three-dimensional map data but is included in the specific space in the recognition result information is detected as a removal target by the management system.

According to the first aspect, the three-dimensional map data including the specific space information indicating the specific space is used. The specific space is defined as a space between the recognition target and the specific position from which the recognition target is to be recognized. Using the three-dimensional map data including the specific space information indicating such the specific space makes it possible to detect with high accuracy an obstacle inhibiting the recognition process as a removal target. As a result, it is possible to efficiently ensure a favorable environment for the recognition process. That is, it is possible to efficiently manage an environment of the predetermined area.

According to the second aspect, using the semantic model information of the predetermined area makes it possible to efficiently generate the three-dimensional map data including the specific space information indicating the specific space. Using such the three-dimensional map data makes it possible to efficiently ensure a favorable environment for the recognition process.

According to the third aspect, the three-dimensional map data useful for detecting with high accuracy, as a removal target, an obstacle inhibiting the recognition process is provided. Using such the three-dimensional map data makes it possible to efficiently ensure a favorable environment for the recognition process.

EMBODIMENTS

Embodiments of the present disclosure will be described with reference to the accompanying drawings.

1. Overview 1-1. Predetermined Area

Figure 1:
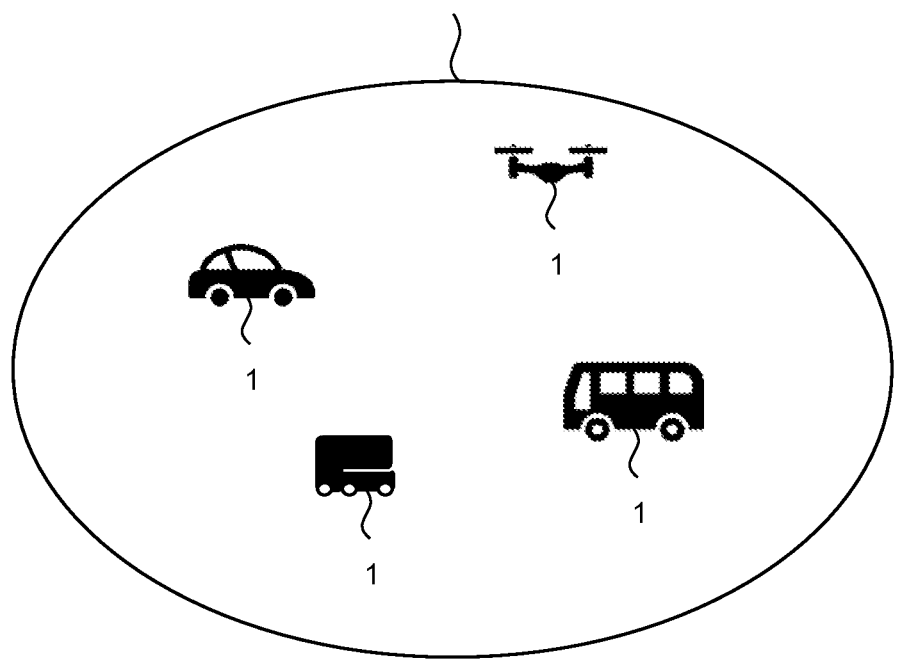
FIG. 1 is a conceptual diagram for explaining a predetermined area.

FIG. 1 is a conceptual diagram for explaining a predetermined area AR. For example, the predetermined area AR is a city (e.g., a smart city). As another example, the predetermined area AR may be a site of a facility. As still another example, the predetermined area AR may be an area in a building.

Various objects are present in the predetermined area AR. Typically, there is a moving body 1 (mobility) that moves in the predetermined area AR. Examples of the moving body 1 include a vehicle, a robot, a flying object, and the like. The vehicle may be an autonomous driving vehicle or may be a vehicle driven by a driver. Examples of the robot include a delivery robot, a cleaning robot, a planter robot, and the like. Examples of the flying object include an airplane, a drone, and the like.

1-2. Recognition Process Using Recognition Sensor

The moving body 1 has at least a recognition function that recognizes a surrounding situation. More specifically, the moving body 1 is provided with a recognition sensor that recognizes a surrounding situation. Examples of the recognition sensor include a camera, laser imaging detection and ranging (LIDAR), a radar, and the like. The moving body 1 performs a recognition process that recognizes a surrounding situation by using the recognition sensor. In particular, the moving body 1 uses the recognition sensor to recognize an object around the moving body 1. Examples of the object around the moving body 1 include a pedestrian, another vehicle (a preceding vehicle, a parked vehicle, and the like), a traffic signal, a white line, a crosswalk, a sign, and the like. For example, analyzing an image IMG captured by the camera makes it possible to identify an object and calculate a relative position of the object. It is also possible to identify an object and acquire a relative position and a relative speed of the object based on point cloud information acquired by the LIDAR.

The moving body 1 performs a predetermined process based on a result of recognition by the recognition sensor. For example, the moving body 1 autonomously moves based on the result of recognition by the recognition sensor. As another example, the moving body 1 may support an operator's operation of the moving body 1 based on the result of recognition by the recognition sensor. As still another example, the moving body 1 may present the result of recognition by the recognition sensor to the operator.

Figure 2:
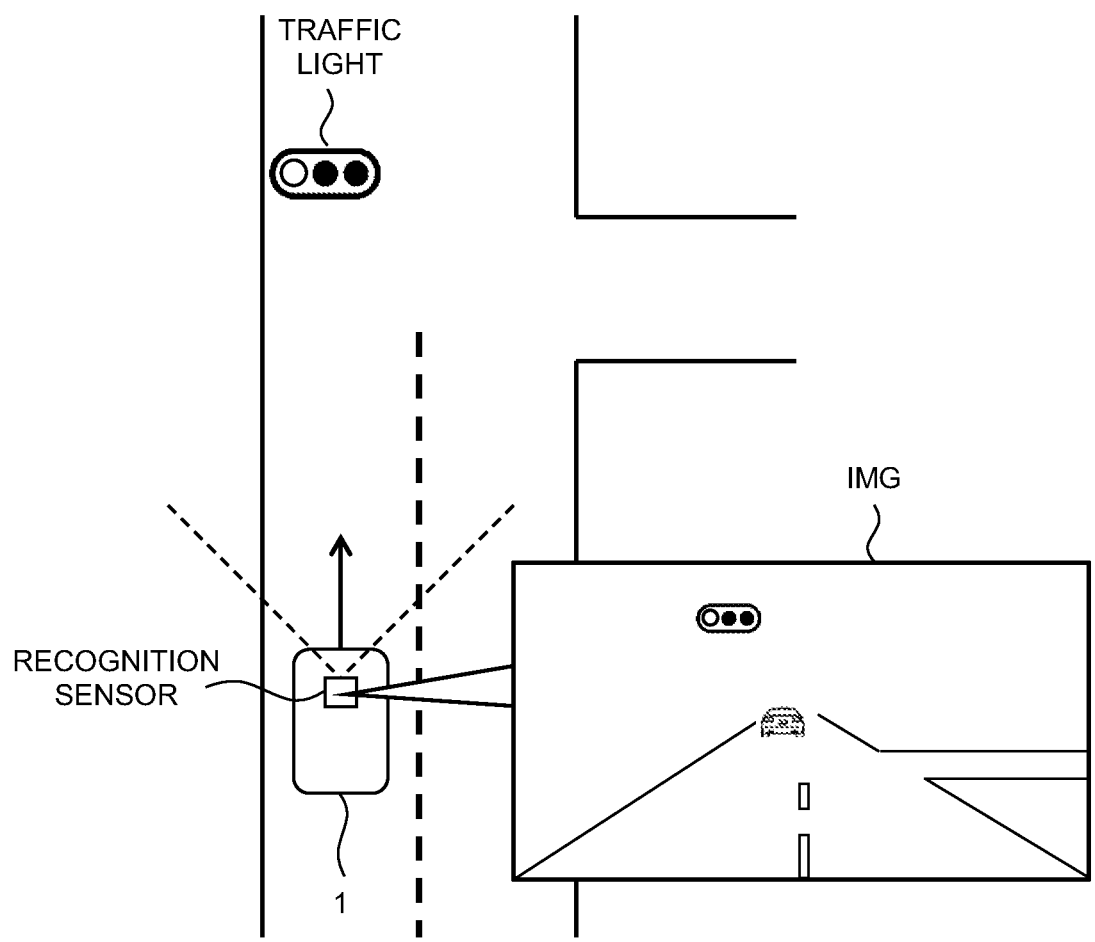
FIG. 2 is a conceptual diagram for explaining an example of a recognition process using a recognition sensor.

FIG. 2 is a conceptual diagram for explaining an example of the recognition process using the recognition sensor. In an example shown in FIG. 2, the moving body 1 is an autonomous driving vehicle. The recognition sensor such as a camera is mounted on the autonomous driving vehicle. The camera captures an image IMG of surroundings of the autonomous driving vehicle. Based on the image IMG captured by the camera, the autonomous driving vehicle recognizes a traffic signal located ahead and its signal indication (green, yellow, red, and the like). In particular, the autonomous driving vehicle needs to recognize a traffic signal and its signal indication in a certain section in front of the traffic signal. Then, the autonomous driving vehicle performs autonomous driving control based on the result of recognition of the traffic signal and its signal indication.

Figure 3:
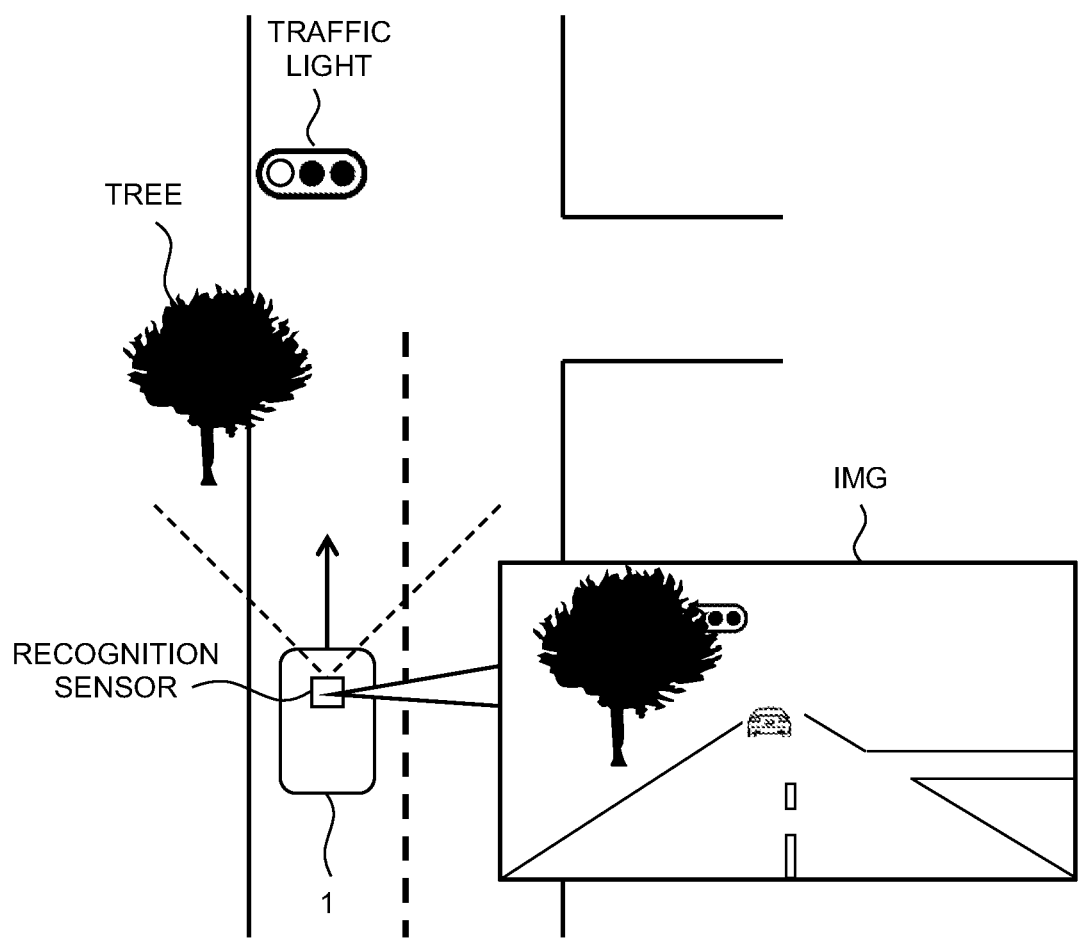
FIG. 3 is a conceptual diagram for explaining an example of a problem related to the recognition process using the recognition sensor.

However, as shown in FIG. 3, when branches and leaves of a street tree grow, at least a part of the traffic signal may be hidden by the grown branches and leaves when viewed from the certain section in front of the traffic signal. That is, at least a part of the traffic signal may become invisible from a position from which the traffic signal should be recognized. This leads to decrease in accuracy of recognition of the traffic signal and its signal indication. The decrease in the accuracy of recognition of the traffic signal and its signal indication causes decrease in accuracy of the autonomous driving control. In order to ensure a favorable environment for the signal recognition, it is necessary to prune the grown branches and leaves of the street tree.

As a comparative example, a case where street trees in the predetermined area AR are uniformly and regularly set as pruning targets is considered. In this case, however, branches and leaves of a street tree at a position which does not affect the signal recognition at all may be unnecessarily pruned. Even regarding a street tree at a position which potentially affects the signal recognition, when branches and leaves do not yet grow to the extent of inhibiting the signal recognition, unnecessary pruning is performed after all. Conversely, there is also a possibility that branches and leaves actually inhibiting the signal recognition are left as they are because the regular pruning time has not yet come. As described above, the comparative example in which the street trees in the predetermined area AR are uniformly and regularly set as the pruning targets is "inefficient." In order to efficiently ensure a favorable environment for the signal recognition, it is necessary to prune only branches and leaves in a truly necessary space at an appropriate timing.

Figure 4:
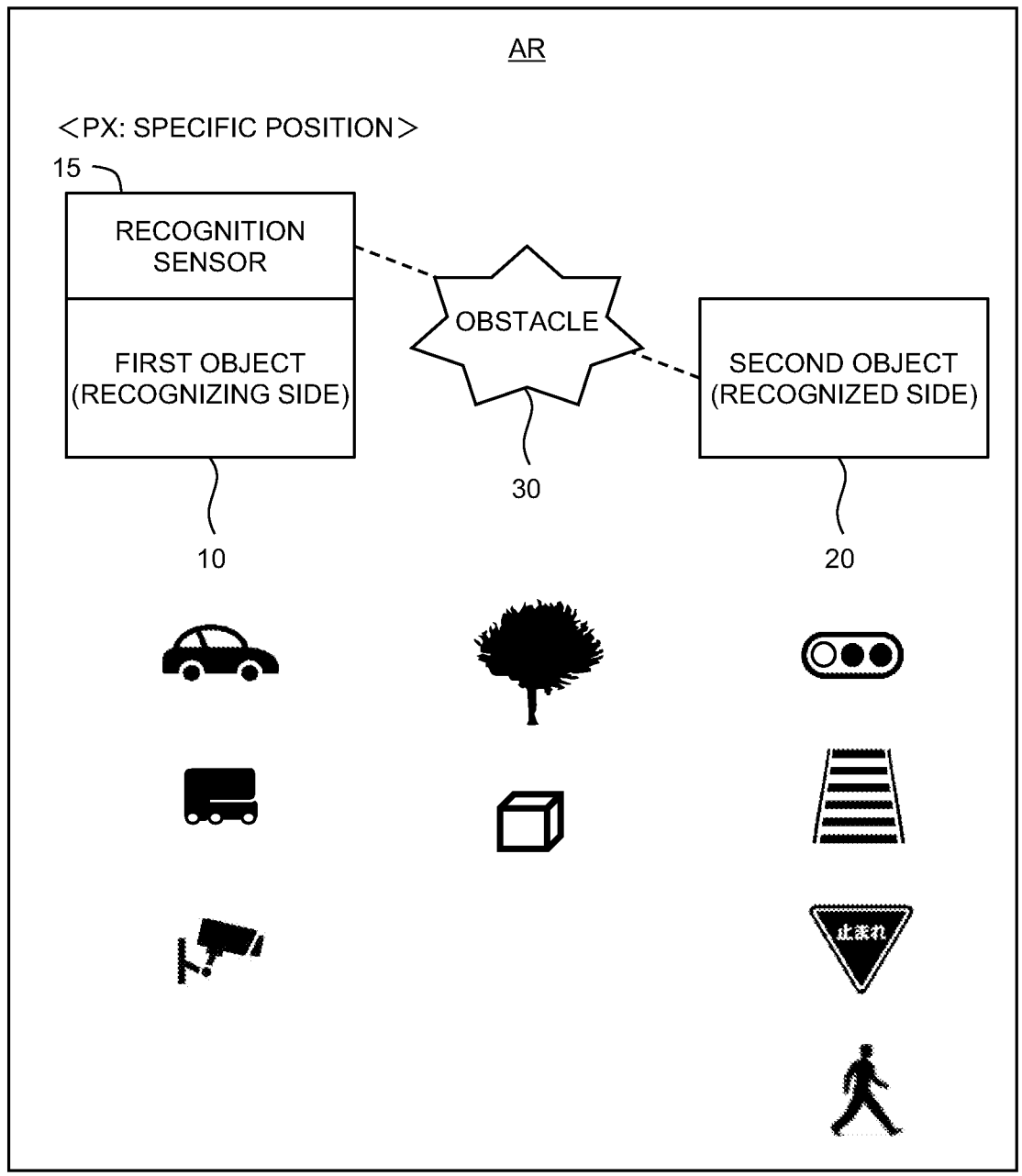
FIG. 4 is a conceptual diagram for explaining a recognition process using a recognition sensor and a problem thereof according to an embodiment of the present disclosure.

Referring to FIG. 4, the recognition process using the recognition sensor and a problem thereof will be described in a more generalized manner. There are a first object 10 and a second object 20 in the predetermined area AR.

The first object 10 is provided with a recognition sensor 15 configured to recognize a surrounding situation. Examples of the recognition sensor 15 include a camera, a LIDAR, a radar, and the like. For example, the first object 10 is the moving body 1 described above, and the recognition sensor 15 is mounted on the moving body 1. As another example, the first object 10 may be a monitoring device that monitors a situation in the predetermined area, and the recognition sensor 15 may be included in the monitoring device.

The second object 20 is a "recognition target" to be recognized by the recognition sensor 15. In particular, the second object 20 is a recognition target that should be recognized by the recognition sensor 15 present at a specific position PX in the predetermined area AR. For example, the second object 20 is a traffic signal (see FIGS. 2 and 3). The traffic signal needs to be recognized by the recognition sensor 15 in a certain section in front of the traffic signal, and the certain section corresponds to the specific position PX. The second object 20 is not limited to the traffic signal. Other examples of the second object 20 include a crosswalk, a sign, a pedestrian, and the like. It should be noted that the second object 20 does not need to be recognized by the recognition sensor 15 present at a position other than the specific position PX.

An obstacle 30 is an object that inhibits the recognition process by the recognition sensor 15. That is, the obstacle 30 is an object present in a space between the recognition sensor 15 present at the specific position PX and the second object 20. Examples of the obstacle 30 include branches and leaves of trees, a fallen object, a flown object, trash, an illegally parked vehicle, and the like.

If such the obstacle 30 is present, the recognition process using the recognition sensor 15 may be inhibited and thus accuracy of recognition of the second object 20 may be decreased. In order to ensure a favorable environment for the recognition process, it is necessary to detect and remove (exclude) the obstacle 30. However, it is generally not easy to determine which object is the obstacle 30 that actually inhibits the recognition process. It is inefficient to remove (exclude) an irrelevant object that does not actually affect the recognition process. It is desirable to more efficiently ensure a favorable environment for the recognition process.

In view of the above, the present embodiment proposes a technique capable of detecting with high accuracy the obstacle 30 (i.e., a true removal target) that inhibits the recognition process by the recognition sensor 15. Detecting the true removal target with high accuracy makes it possible to more efficiently ensure a favorable environment for the recognition process.

1-3. Specific Space

Figure 5:
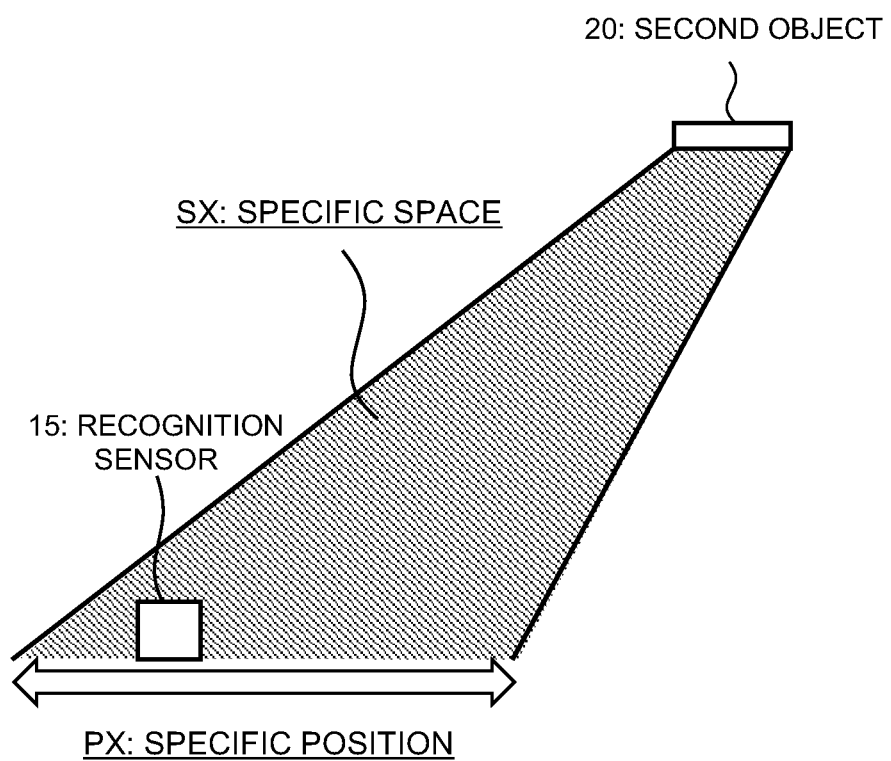
FIG. 5 is a conceptual diagram for explaining a specific space according to an embodiment of the present disclosure.

FIG. 5 is a conceptual diagram for explaining a feature of the present embodiment. According to the present embodiment, a concept of a "specific space SX" is introduced in order to detect with high accuracy the obstacle 30 that inhibits the recognition process by the recognition sensor 15. As described above, the second object 20 is a recognition target that should be recognized by the recognition sensor 15 present at the specific position PX. The specific space SX is a space between the specific position PX and the second object 20 (i.e., the recognition target).

In order to recognize the second object 20 with high accuracy by the recognition sensor 15, the specific space SX is required to have good visibility. If an object is present in the specific space SX, the object serves as the obstacle 30 that inhibits the recognition process by the recognition sensor 15. Therefore, the object included in the specific space SX is detected as the obstacle 30 being a removal target. On the other hand, there is no need to remove an object present outside the specific space SX since it does not affect the recognition process. That is to say, an object present outside the specific space SX is not detected as a removal target, and only an object included in the specific space SX is detected as a removal target.

As described above, defining the specific space SX in consideration of a positional relationship between the specific position PX and the second object 20 (i.e., the recognition target) makes it possible to detect with high accuracy the obstacle 30 (i.e., a true removal target) that actually inhibits the recognition process. As a result, it is possible to efficiently ensure a favorable environment for the recognition process. That is, it is possible to efficiently manage the environment of the predetermined area AR.

There may be a situation in which branches and leaves of a street tree have not yet entered the specific space SX but grown to the vicinity of the specific space SX. Detecting such the branches and leaves as a "removal target candidate" in advance is also useful from a viewpoint of managing the environment of the predetermined area AR. For example, it is possible to plan in advance in which order the removal target candidates at a plurality of positions are to be removed. This makes it possible to efficiently ensure a favorable environment for the recognition process.

Figure 6:
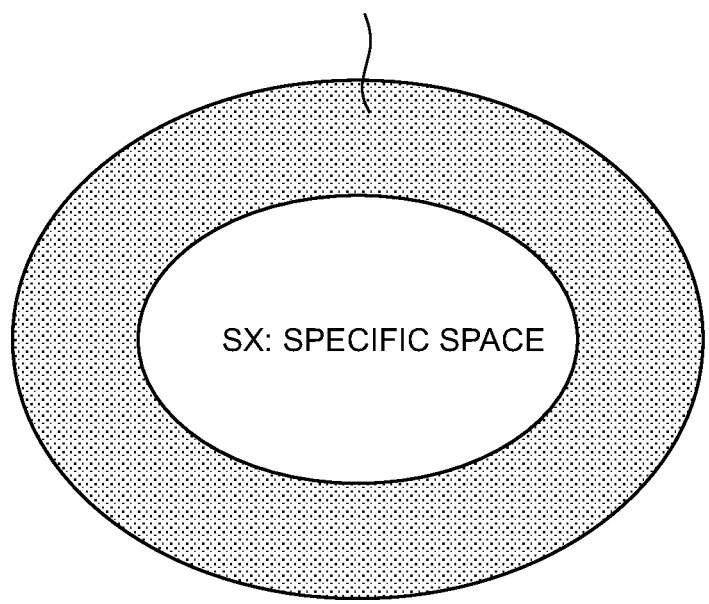
FIG. 6 is a conceptual diagram for explaining a specific surrounding space according to an embodiment of the present disclosure.

FIG. 6 is a conceptual diagram for explaining a "specific surrounding space SY" for detecting the removal target candidate. The specific surrounding space SY is a finite space around the specific space SX. For example, the specific surrounding space SY is a space within a certain distance from an outer surface of the specific space SX. An object included in the specific surrounding space SY is detected as the removal target candidate. The removal target candidate may become a removal target in the near future.

Information on the specific space SX and the specific surrounding space SY described above is provided as three-dimensional map data.

1-4. Three-Dimensional Map Data, Map Generation System, and Management System

Figure 7:
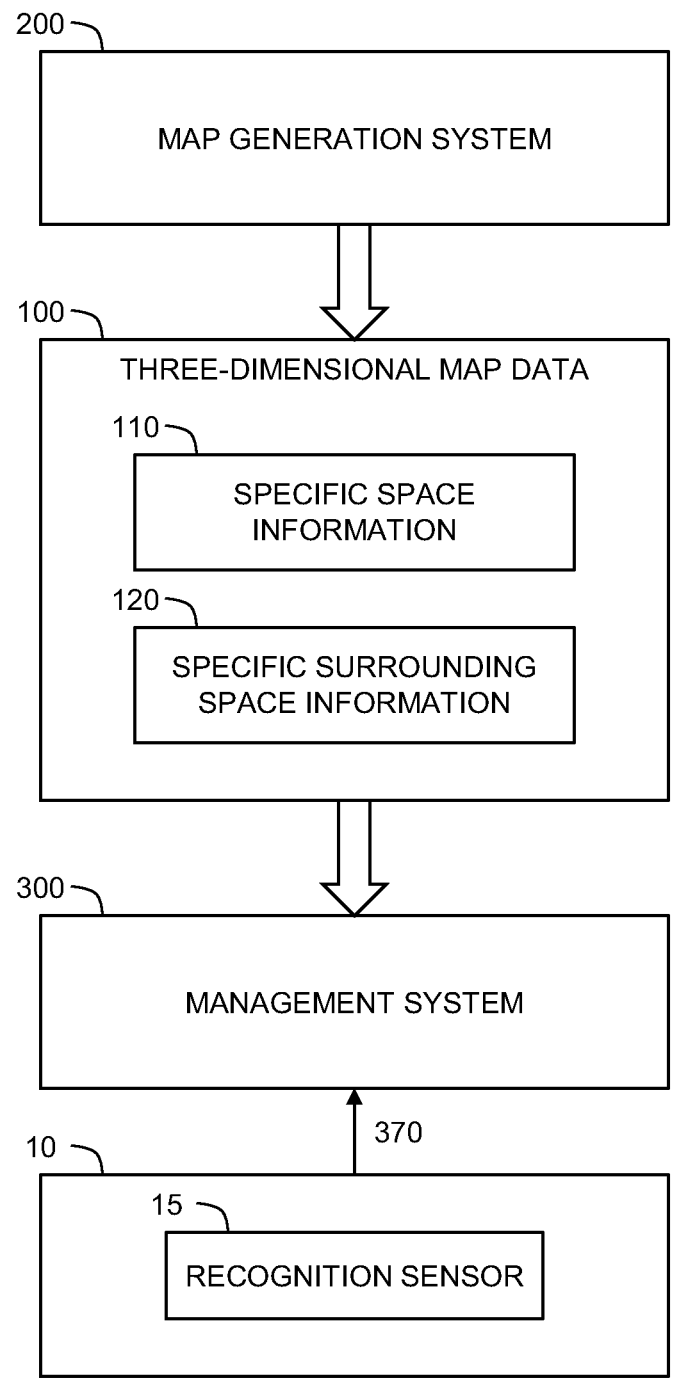
FIG. 7 is a block diagram for explaining an overview of three-dimensional map data, a map generation system, and a management system according to an embodiment of the present disclosure.

FIG. 7 is a block diagram for explaining an overview of three-dimensional map data 100, a map generation system 200, and a management system 300 according to the present embodiment.

The three-dimensional map data 100 are three-dimensional map data of the predetermined area AR. That is, the three-dimensional map data 100 indicates a three-dimensional configuration of structures (e.g., roads, road structures, buildings, and the like) in the predetermined area AR.

The three-dimensional map data 100 further include specific space information 110 indicating the specific space SX described above. The specific space information 110 indicates a position of the specific space SX in the predetermined area AR. In addition, the specific space information 110 may include metadata indicating that "an object present in the specific space SX is a removal target."

The three-dimensional map data 100 may further include specific surrounding space information 120 indicating the specific surrounding space SY described above. The specific surrounding space information 120 indicates a position of the specific surrounding space SY in the predetermined area AR. In addition, the specific surrounding space information 120 may include metadata indicating that "an object present in the specific surrounding space SY is a removal target candidate."

The map generation system 200 generates the three-dimensional map data 100. In particular, the map generation system 200 efficiently generates the three-dimensional map data 100 including the specific space information 110. The map generation system 200 is realized by, for example, a management server on a cloud. The management server may be configured by a plurality of servers that perform distributed processing. As another example, at least a part of functions of the map generation system 200 may be included in the first object 10 (the moving body 1). Details of the map generation system 200 will be described in Section 2 below.

The management system 300 manages the environment of the predetermined area AR. In particular, the management system 300 efficiently manages the environment of the predetermined area AR by utilizing the three-dimensional map data 100 of the predetermined area AR. The management system 300 is realized by, for example, a management server on a cloud. The management server may be configured by a plurality of servers that perform distributed processing. As another example, at least a part of functions of the management system 300 may be included in the first object 10 (the moving body 1). Details of management system 300 will be described in Section 3 below.

The map generation system 200 and the management system 300 may be separated from each other or may be at least partially common. The management system 300 may have the functions of the map generation system 200. The map generation system 200 may have the functions of the management system 300.

Hereinafter, the map generation system 200 and the management system 300 according to the present embodiment will be described in detail.

2. Map Generation System 2-1. Configuration Example

Figure 8:
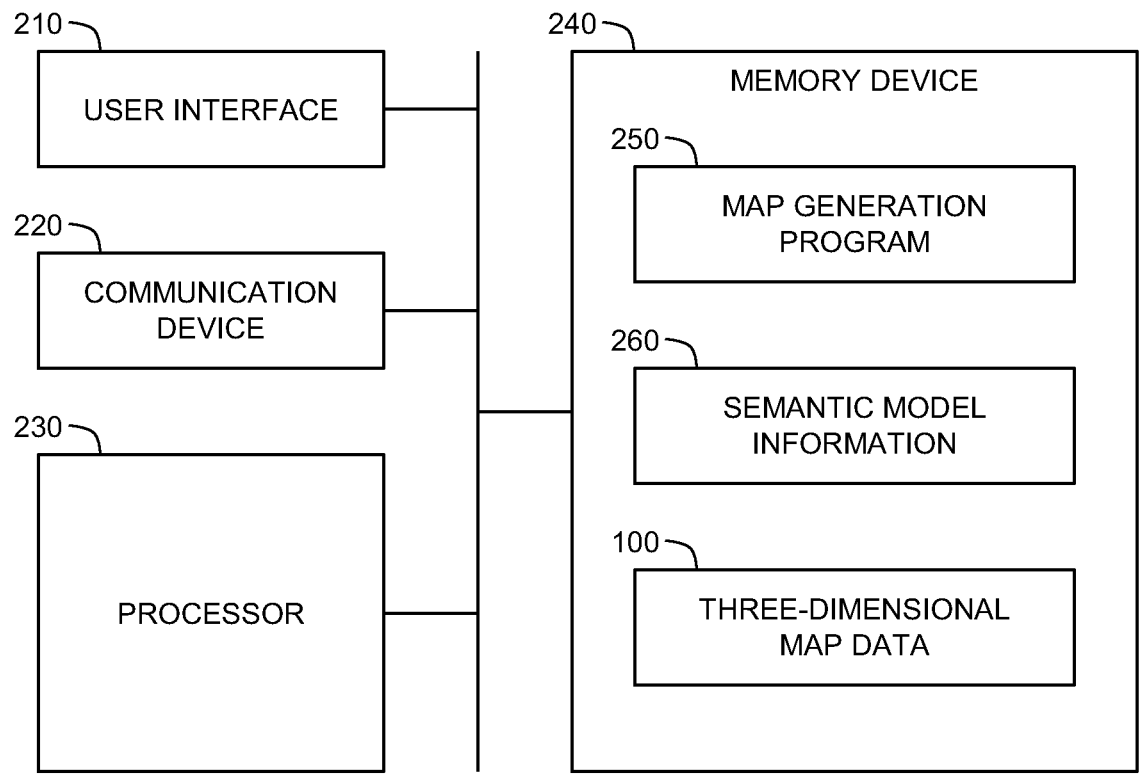
FIG. 8 is a block diagram showing a configuration example of a map generation system according to an embodiment of the present disclosure.

FIG. 8 is a block diagram showing a configuration example of the map generation system 200 according to the present embodiment. The map generation system 200 includes a user interface 210, a communication device 220, one or more processors 230 (hereinafter simply referred to as a processor 230), and one or more memory devices 240 (hereinafter simply referred to as a memory device 240).

The user interface 210 receives information input from a user (administrator) and provides a variety of information to the user. The user interface 210 includes an input device and an output device. Examples of the input device include a keyboard, a mouse, a touch panel, and the like. Examples of the output device include a display device, a touch panel, and a speaker. The user interface 210 may be a graphical user interface (GUI).

The communication device 220 communicates with the outside via a communication network.

The processor 230 executes a variety of processing. For example, the processor 230 includes a central processing unit (CPU). The memory device 240 stores a variety of information. Examples of the memory device 240 include a volatile memory, a nonvolatile memory, a hard disk drive (HDD), a solid state drive (SSD), and the like.

A map generation program 250 is a computer program executed by the processor 230. Functions of the map generation system 200 may be implemented by the processor 230 executing the map generation program 250. The map generation program 250 is stored in the memory device 240. Alternatively, the map generation program 250 may be recorded on a non-transitory computer-readable recording medium. The map generation program 250 may be provided via a network.

Semantic model information 260 is information on a "semantic model" of the predetermined area AR. The semantic model is a 3D model based on an idea such as building information modeling (BIM) or construction information modeling (CIM). However, the semantic model is not a simple 3D mode, but includes "attribute information" for each of components (objects) constituting the predetermined area. Examples of the attribute information of a component include a type, a position, a shape, a size, a material, and the like of the component. The semantic model information 260 is stored in the memory device 240.

The processor 230 efficiently generates the three-dimensional map data 100 by utilizing the semantic model information 260. The three-dimensional map data 100 generated are stored in the memory device 240. Hereinafter, a map generation process performed by the processor 230 will be described.

2-2. Map Generation Process 2-2-1. First Example

Figure 9:
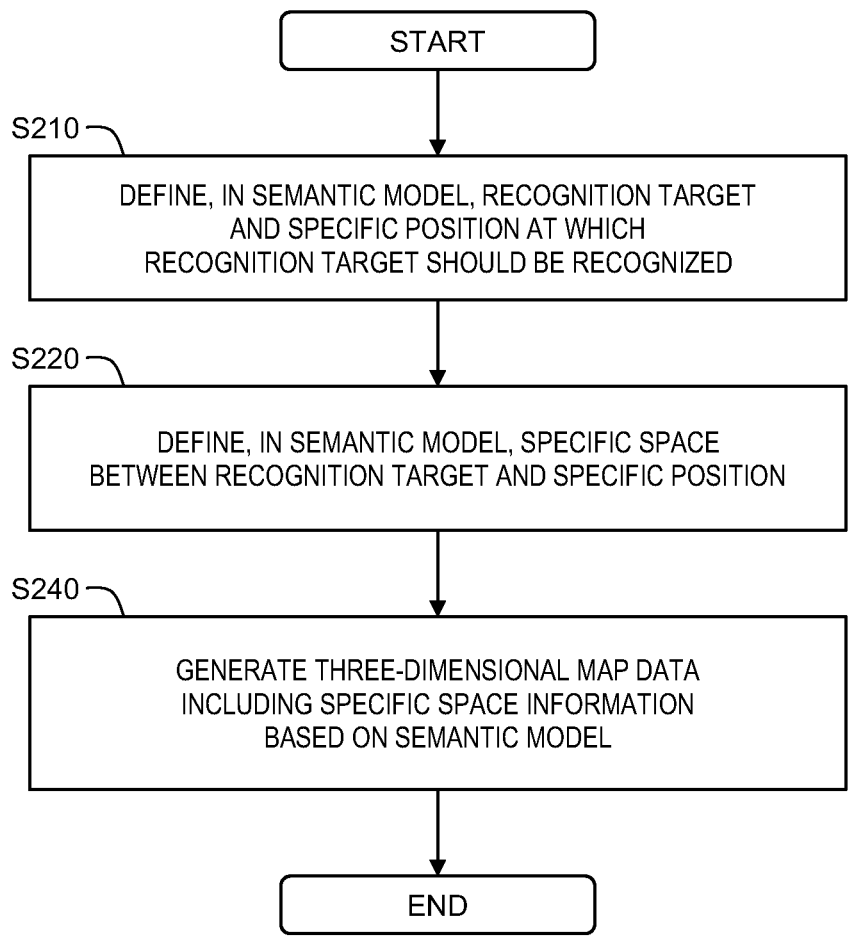
FIG. 9 is a flowchart showing a first example of a map generation process performed by a map generation system according to an embodiment of the present disclosure.

FIG. 9 is a flowchart showing a first example of the map generation process according to the present embodiment.

In Step S210, the processor 230 defines the recognition target to be recognized by the recognition sensor 15 as one of the components (objects) in the semantic model information 260. For example, when the second object 20 is included in the existing semantic model information 260, a user uses the user interface 210 to designate the second object 20 as the recognition target. Alternatively, the user may input a new recognition target and its attribute information by using the user interface 210. The attribute information regarding the recognition target includes a range (a position and a shape) of the recognition target. The processor 230 defines the recognition target as one of the components in the semantic model information 260 in accordance with designation or input by the user.

In addition, the processor 230 defines a position of the recognition sensor 15 from which the recognition target is to be recognized, that is, the specific position PX as one of the components (objects) in the semantic model information 260. For example, when the recognition target is a traffic signal, the specific position PX is a certain section in front of the traffic signal. The specific position PX may be calculated by a combination of a position of the first object 10 recognizing the recognition target and an installation position of the recognition sensor 15 in the first object 10. For example, the user uses the user interface 210 to input the attribute information of the specific position PX for each recognition target. The attribute information regarding the specific position PX includes a range (a position and a shape) of the specific position PX. As another example, the processor 230 may automatically calculate the attribute information of the specific position PX for each recognition target based on a type of each recognition target. In this manner, the processor 230 defines the specific position PX for each recognition target as one of the components in the semantic model information 260.

In Step S220, the processor 230 defines the specific space SX as one of the components (objects) in the semantic model information 260. The specific space SX is a space between the specific position PX and the recognition target. Therefore, the processor 230 is able to automatically calculate the specific space SX based on the specific position PX and the recognition target in the semantic model information 260. Then, the processor 230 adds the calculated specific space SX as one of the components in the semantic model information 260. The attribute information regarding the specific space SX includes a range (a position and a shape) of the specific space SX. The attribute information regarding the specific space SX may include metadata indicating that "an object present in specific space SX is a removal target."

In Step S240, the processor 230 generates the three-dimensional map data 100 based on the semantic model information 260 in which the specific space SX is defined. More specifically, the processor 230 generates the specific space information 110 indicating the specific space SX based on the semantic model information 260 in which the specific space SX is defined. The specific space information 110 indicates the position of the specific space SX in the predetermined area AR. In addition, the specific space information 110 may include metadata indicating that "an object present in the specific space SX is a removal target." The processor 230 may add the generated specific space information 110 to the existing three-dimensional map data 100.

In this manner, the three-dimensional map data 100 including the specific space information 110 indicating the specific space SX are generated. Defining the specific space SX by using the semantic model information 260 makes it possible to efficiently generate the three-dimensional map data 100 including the specific space information 110.

2-2-2. Second Example

Figure 10:
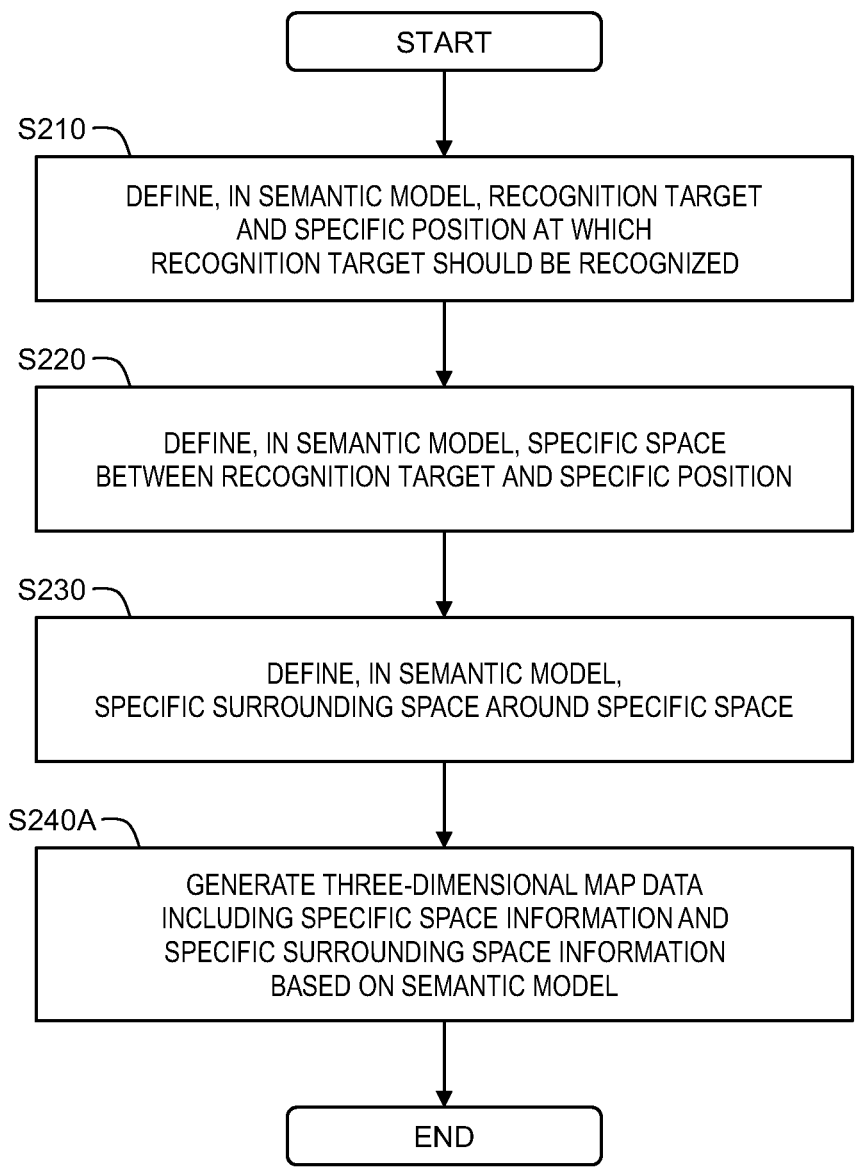
FIG. 10 is a flowchart showing a second example of a map generation process performed by a map generation system according to an embodiment of the present disclosure.

FIG. 10 is a flowchart showing a second example of the map generation process according to the present embodiment. A description overlapping with the first example shown in FIG. 9 will be omitted as appropriate. Steps S210 and S220 are the same as those in the first example.

In Step S230, the processor 230 defines the specific surrounding space SY as one of the components (objects) in the semantic model information 260. The specific surrounding space SY is a finite space around the specific space SX (see FIG. 6). For example, the specific surrounding space SY is a space within a certain distance from an outer surface of the specific space SX. The processor 230 is able to automatically calculate the specific surrounding space SY based on the specific space SX in the semantic model information 260. Alternatively, the user may designate the specific surrounding space SY by using the user interface 210. Then, the processor 230 adds the specific surrounding space SY as one of the components in the semantic model information 260. The attribute information regarding the specific surrounding space SY includes a range (a position and a shape) of the specific surrounding space SY. The attribute information regarding the specific surrounding space SY may include metadata indicating that "an object present in the specific surrounding space SY is a removal target candidate."

In Step S240A, the processor 230 generates the three-dimensional map data 100 including the specific space information 110 and the specific surrounding space information 120. The specific space information 110 is the same as the case of the first example described above. The processor 230 generates the specific surrounding space information 120 indicating the specific surrounding space SY based on the semantic model information 260 in which the specific surrounding space SY is defined. The specific surrounding space information 120 indicates the position of the specific surrounding space SY in the predetermined area AR. In addition, the specific surrounding space information 120 may include metadata indicating that "an object present in the specific surrounding space SY is a removal target candidate." The processor 230 may add the generated specific surrounding space information 120 to the existing three-dimensional map data 100.

In this manner, the three-dimensional map data 100 including the specific space information 110 and the specific surrounding space information 120 are generated. Defining the specific space SX and the specific surrounding space SY by using the semantic model information 260 makes it possible to efficiently generate the three-dimensional map data 100 including the specific space information 110 and the specific surrounding space information 120.

2-3. Map Update Process

The configuration (arrangement) of the recognition target (i.e., the second object 20) in the predetermined area AR may be changed. For example, a new traffic signal is installed. As another example, a position of an existing traffic signal is changed. When the configuration of the recognition target in the predetermined area AR is changed, the processor 230 executes a map update process that updates the three-dimensional map data 100. More specifically, the processor 230 updates the definitions of the recognition target, the specific position PX, the specific space SX, and the specific surrounding space SY in the semantic model information 260 based on the changed configuration (arrangement) of the recognition target. Then, the processor 230 updates the three-dimensional map data 100 based on the updated semantic model information 260.

As described above, utilizing the semantic model information 260 makes it possible to easily update the three-dimensional map data 100.

2-4. Sensor Field-of-View Check Process

Figure 11:
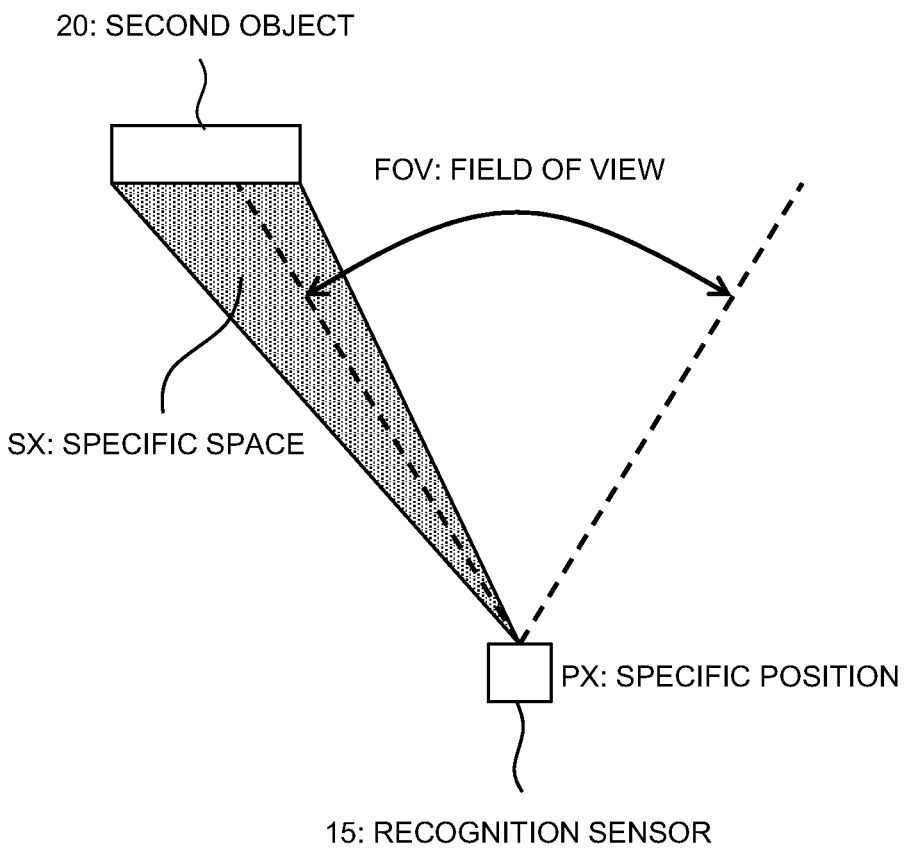
FIG. 11 is a conceptual diagram for explaining a sensor field-of-view check process performed by a map generation system according to an embodiment of the present disclosure.

FIG. 11 shows an example of a field of view FOV of the recognition sensor 15 present at the specific position PX and the specific space SX. When at least a part of the specific space SX deviates from the field of view FOV, the recognition target (i.e., the second object 20) cannot be sufficiently recognized and thus the accuracy of recognition decreases. If such a shortage of the field of view can be detected in advance, it is possible to change an installation position of the recognition target or to change a design of the recognition sensor 15. In other words, it is possible to improve a design of the predetermined area AR. Therefore, it is useful to compare the field of view FOV of the recognition sensor 15 present at the specific position PX with the specific space SX. This process is hereinafter referred to as a "sensor field-of-view check process."

Figure 12:
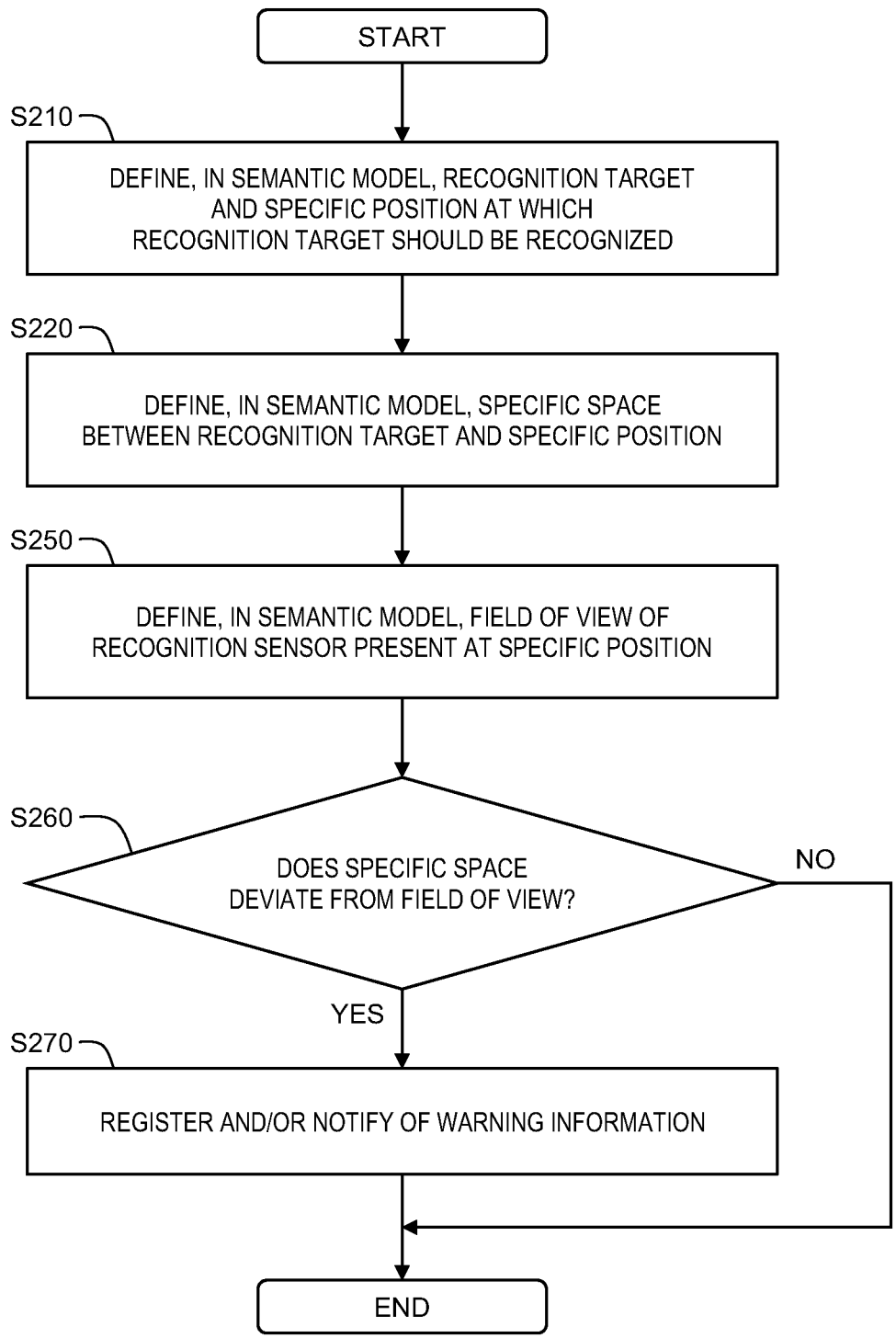
FIG. 12 is a flowchart showing processing related to a sensor field-of-view check process performed by a map generation system according to an embodiment of the present disclosure.

FIG. 12 is a flowchart showing processing related to the sensor field-of-view check process. Steps S210 and S220 are as described above.

In Step S250, the processor 230 defines the field of view FOV of the recognition sensor 15 present at the specific position PX as one of the components (objects) in the semantic model information 260. For example, the user uses the user interface 210 to input installation information and performance information of the recognition sensor 15. The processor 230 calculates the field of view FOV of the recognition sensor 15 present at the specific position PX based on the specific position PX and the installation information and the performance information of the recognition sensor 15 in the semantic model information 260. Then, the processor 230 defines the calculated field of view FOV as one of the components in the semantic model information 260. The attribute information regarding the field of view FOV includes a range (a position and a shape) of the field of view FOV.

In Step S260, the processor 230 compares the specific space SX and the field of view FOV defined in the semantic model information 260. When at least a part of the specific space SX deviates from the field of view FOV (Step S260; Yes), the processing proceeds to Step S270.

In Step S270, the processor 230 adds warning information indicating a shortage of the field of view to the specific space information 110. The processor 230 may notify the user (administrator) of the warning information indicating the shortage of the field of view via the user interface 210. The user (administrator) can change the installation position of the recognition target or change the design of the recognition sensor 15. That is, the user (administrator) can improve the design of the predetermined area AR.

3. Management System 3-1. Configuration Example

Figure 13:
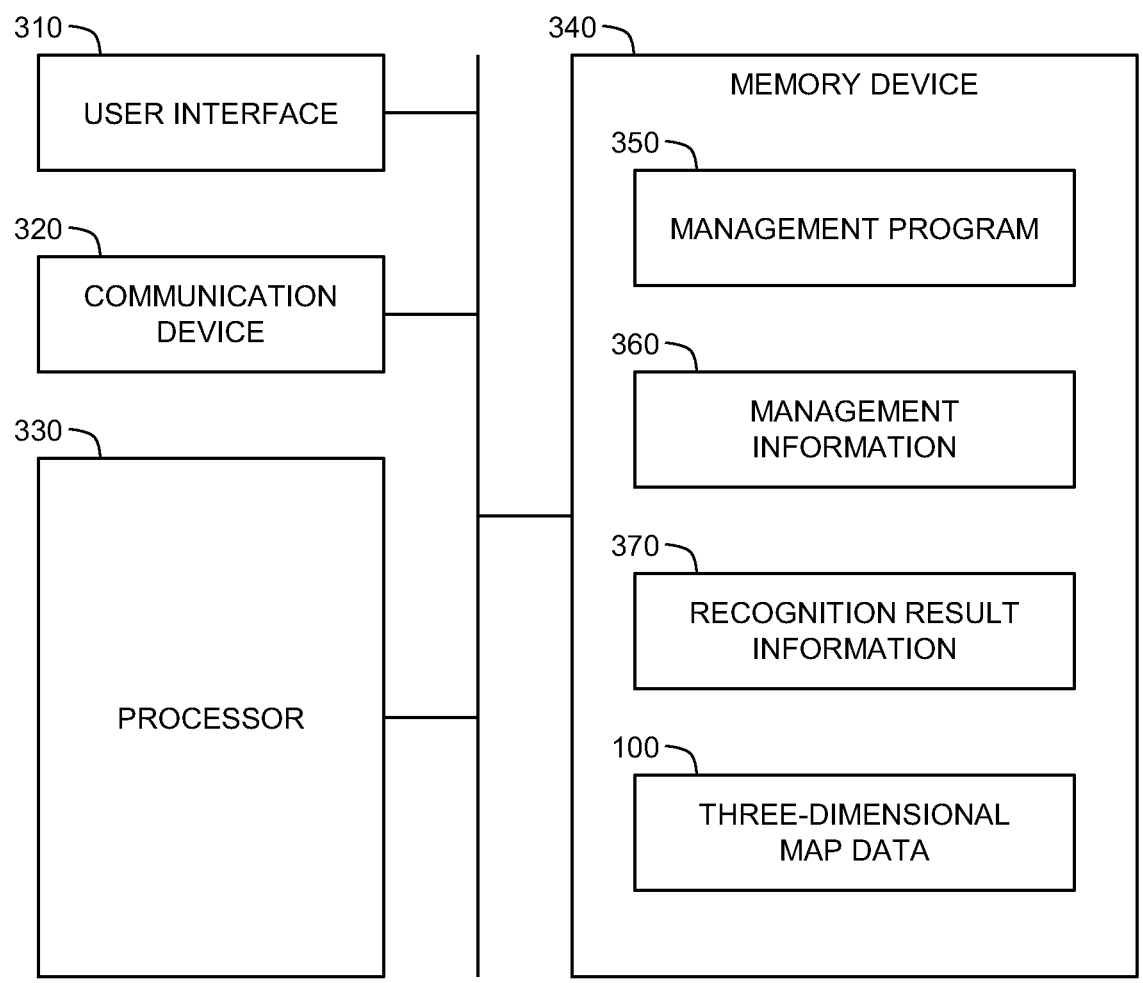
FIG. 13 is a block diagram showing a configuration example of a management system according to an embodiment of the present disclosure.

FIG. 13 is a block diagram showing a configuration example of the management system 300 according to the present embodiment. The management system 300 includes a user interface 310, a communication device 320, one or more processors 330 (hereinafter simply referred to as a processor 330), and one or more memory devices 340 (hereinafter simply referred to as a memory device 340).

The user interface 310 receives information input from a user (administrator) and provides a variety of information to the user. The user interface 310 includes an input device and an output device. Examples of the input device include a keyboard, a mouse, a touch panel, and the like. Examples of the output device include a display device, a touch panel, and a speaker. The user interface 310 may be a graphical user interface (GUI).

The communication device 320 communicates with the outside via a communication network.

The processor 330 executes a variety of processing. For example, the processor 330 includes a central processing unit (CPU). The memory device 340 stores a variety of information. Examples of the memory device 340 include a volatile memory, a nonvolatile memory, a hard disk drive (HDD), a solid state drive (SSD), and the like. At least a part of the processor 330 and the memory device 340 may be included in the first object 10 (the moving body 1). That is, at least a part of the functions of the management system 300 may be included in the first object 10 (the moving body 1).

A management program 350 is a computer program executed by the processor 330. The functions of the management system 300 may be implemented by the processor 330 executing the management program 350. The management program 350 is stored in the memory device 340. Alternatively, the management program 350 may be recorded on a non-transitory computer-readable recording medium. The management program 350 may be provided via a network.

Management information 360 is information used for management of the predetermined area AR. For example, the management information 360 includes a "removal history database" indicating a correspondence relationship between the position of the obstacle 30 in the predetermined area AR and a removal history of the obstacle 30. As another example, the management information 360 may include a "removal schedule database" indicating a correspondence relationship between the position of the obstacle 30 in the predetermined area AR and a removal schedule of the obstacle 30. The management information 360 is stored in the memory device 340.

Recognition result information 370 is information indicating a result of the recognition process performed by the recognition sensor 15 present at the specific position PX. In particular, the recognition result information 370 indicates a position of an object recognized by the recognition sensor 15 present at the specific position PX.

The position of the object may be an absolute position in an absolute coordinate system or may be a relative position with respect to the recognition sensor 15. The relative position of the object with respect to the recognition sensor 15 can be calculated by using the recognition sensor 15. For example, analyzing an image IMG captured by the camera makes it possible to identify an object and calculate the relative position of the object. It is also possible to identify an object and acquire the relative position of the object based on point cloud information acquired by the LIDAR. Meanwhile, the first object 10 (the moving body 1) has a position identification function that identifies its own position. For example, the first object 10 is provided with a GPS (Global Positioning System) sensor and identifies its own position by using the GPS sensor. The first object 10 may identify its own position with high accuracy by a localization process based on the result of recognition and map information. An installation position of the recognition sensor 15 in the first object 10 is known information. Therefore, a conversion between the relative position and the absolute position of the object is possible. In the following description, the relative position and the absolute position of the object are regarded as equivalent. The same applies to the specific space SX.

The three-dimensional map data 100 are provided from the map generation system 200 described above. For example, the processor 330 acquires the three-dimensional map data 100 from the map generation system 200 via the communication device 320. As another example, when the function of the map generating system 200 is included in the management system 300, the processor 330 may generate the three-dimensional map data 100. The three-dimensional map data 100 acquired are stored in the memory device 340. The three-dimensional map data 100 may be recorded on a non-transitory computer-readable recording medium. Further, the processor 330 reads the three-dimensional map data 100 from the memory device 340 or the non-transitory computer-readable recording medium, and executes a "management process" described below.

3-2. Management Process 3-2-1. First Example

Figure 14:
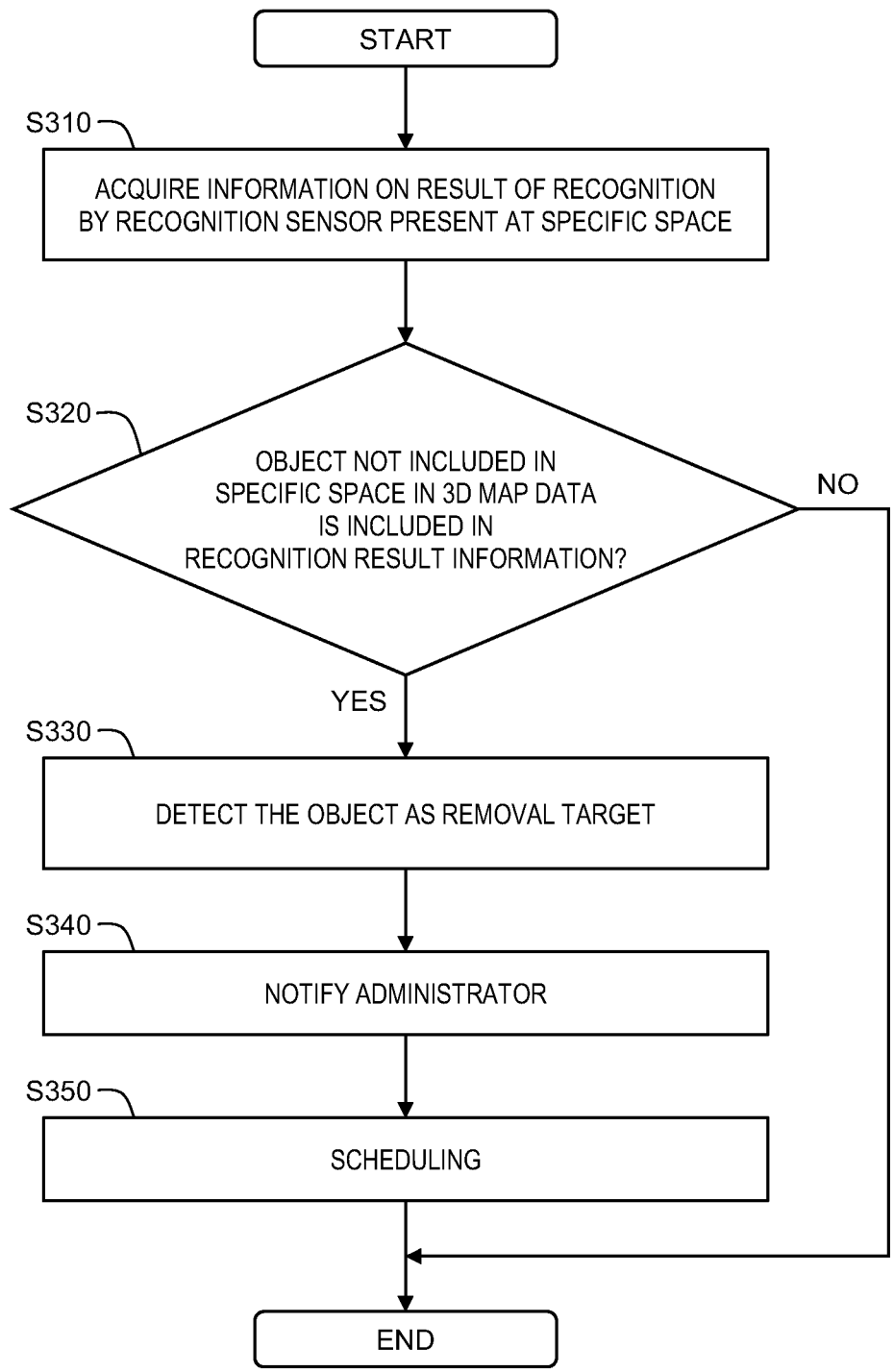
FIG. 14 is a flowchart showing a first example of a management process performed by a management system according to an embodiment of the present disclosure.

FIG. 14 is a flowchart showing a first example of the management process according to the present embodiment.

In Step S310, the processor 330 acquires the recognition result information 370 indicating the result of the recognition process performed by the recognition sensor 15 present at the specific position PX.

In Step S320, the processor 330 reads the three-dimensional map data 100 from the memory device 340. The three-dimensional map data 100 includes the specific space information 110 indicating the specific space SX. The processor 330 compares the three-dimensional map data 100 and the recognition result information 370 to determine whether or not an object that is not included in the specific space SX in the three-dimensional map data 100 is included in the specific space SX in the recognition result information 370. When an object that is not included in the specific space SX in the three-dimensional map data 100 is included in the specific space SX in the recognition result information 370 (Step S320; Yes), the processing proceeds to Step S330. Otherwise (Step S320; No), the processing shown in FIG. 14 ends.

In Step S330, the processor 330 detects, as a removal target (i.e., the obstacle 30), the object that is not included in the specific space SX in the three-dimensional map data 100 but included in the specific space SX in the recognition result information 370.

In Step S340, the processor 330 notifies the administrator of recommendation information via the user interface 310. The recommendation information recommends removal of the removal target (i.e., the obstacle 30) detected in Step S330. The recommendation information may include the image IMG captured by the camera. The image IMG is included in the recognition result information 370. The recommendation information may indicate the removal target (the obstacle 30) in the image IMG. The recommendation information may highlight the removal target (the obstacle 30) in the image IMG. The administrator viewing the recommended information is able to consider immediately removing the obstacle 30.

In Step S350, the processor 330 may create a schedule for immediately removing the obstacle 30. The processor 330 updates the management information 360 (the removal schedule database) based on the created schedule. The administrator removes the obstacle 30 in accordance with the schedule indicated in the removal schedule database. When the removal of the obstacle 30 is completed, the processor 330 updates the management information 360 (the removal history database).

As described above, using the three-dimensional map data 100 including the specific space information 110 indicating the specific space SX makes it possible to detect the obstacle 30 that inhibits the recognition process. In particular, the specific space SX is defined in consideration of the positional relationship between the recognition target and the specific position PX from which the recognition target is to be recognized. Therefore, the obstacle 30 that actually inhibits the recognition process is detected as the removal target. Conversely, an object that is present outside the specific space SX and does not affect the recognition process is not detected as a removal target. In other words, an object present outside the specific space SX is prohibited from being detected as a removal target. Thus, erroneous detection of the removal target is suppressed.

Moreover, the obstacle 30 is detected based on the comparison between the actual recognition result information 370 acquired by the recognition sensor 15 and the three-dimensional map data 100. Therefore, it is possible to detect the obstacle 30 inhibiting the recognition process at an appropriate timing. This also contributes to suppression of the erroneous detection of the removal target. In addition, occurrence of the obstacle 30 (for example, a flown object) which is difficult to predict can be detected almost in real time.

As described above, according to the present embodiment, it is possible to detect with high accuracy the obstacle 30 (i.e., the true removal target) that inhibits the recognition process. As a result, it is possible to efficiently ensure a favorable environment for the recognition process. That is, it is possible to efficiently manage the environment of the predetermined area AR.

3-2-2. Second Example

Figure 15:
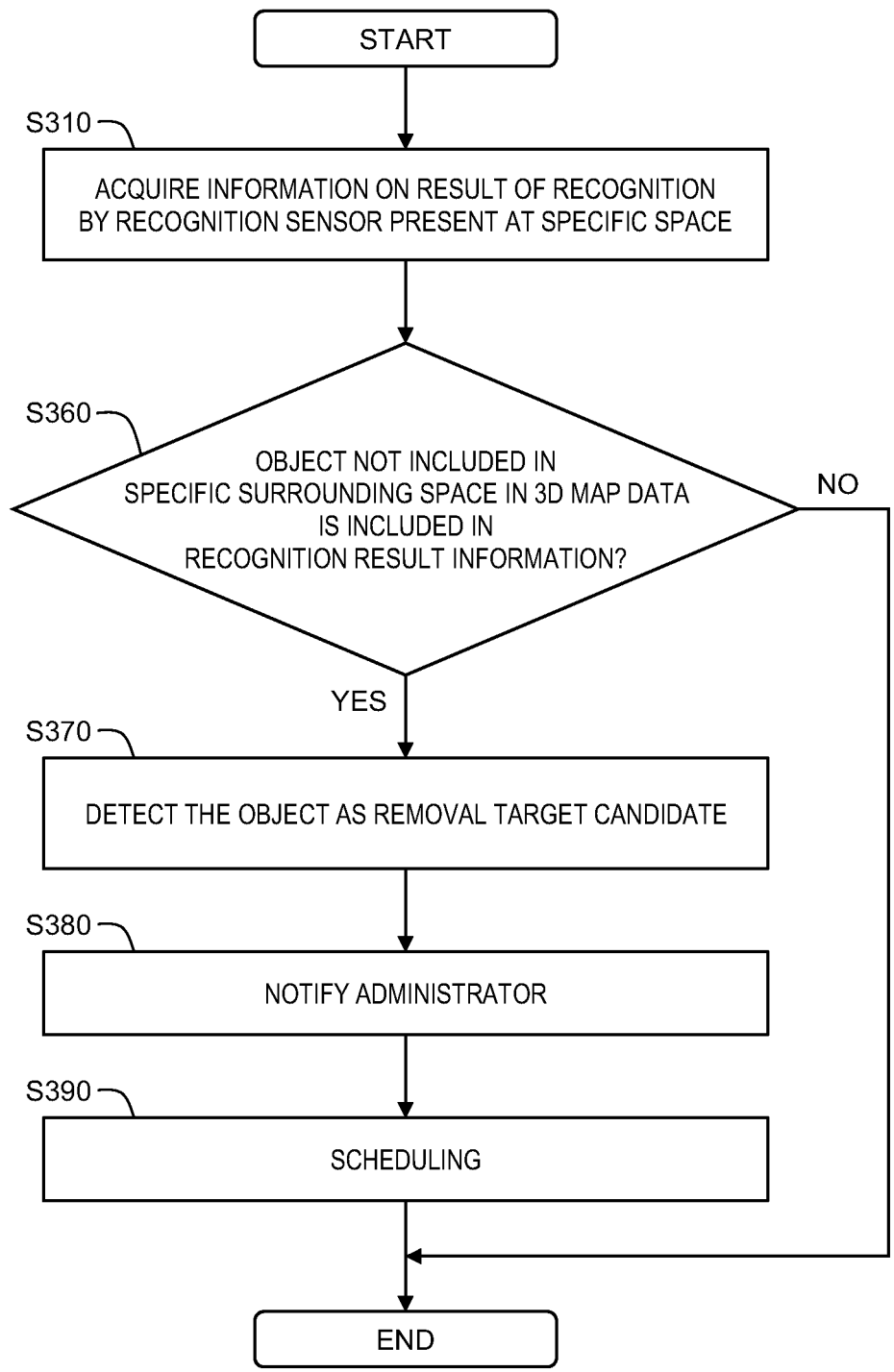
FIG. 15 is a flowchart showing a second example of a management process performed by a management system according to an embodiment of the present disclosure.

FIG. 15 is a flowchart showing a second example of the management process according to the present embodiment.

In Step S310, the processor 330 acquires the recognition result information 370 indicating the result of the recognition process performed by the recognition sensor 15 present at the specific position PX.

In Step S360, the processor 330 reads the three-dimensional map data 100 from the memory device 340. The three-dimensional map data 100 includes specific surrounding space information 120 indicating the specific surrounding space SY. The processor 330 compares the three-dimensional map data 100 and the recognition result information 370 to determine whether or not an object that is not included in the specific surrounding space SY in the three-dimensional map data 100 is included in the specific surrounding space SY in the recognition result information 370. If an object that is not included in the specific surrounding space SY in the three-dimensional map data 100 is included in the specific surrounding space SY in the recognition result information 370 (Step S360; Yes), the processing proceeds to Step S370. Otherwise (Step S360; No), the processing shown in FIG. 15 ends.

In Step S370, the processor 330 detects, as a removal target candidate, the object that is not included in the specific surrounding space SY in the three-dimensional map data 100 but included in the specific surrounding space SY in the recognition result information 370. The removal target candidate may become a removal target in the near future.

In Step S380, the processor 330 notifies the administrator of attention information via the user interface 310. The attention information indicates the presence of the removal target candidate. The attention information may include the image IMG captured by the camera. The image IMG is included in the recognition result information 370. The attention information may indicate the removal target candidate in the image IMG. The attention information may highlight the removal target candidate in the image IMG. The attention information may suggest creation of a schedule for removing the removal target candidate to the administrator. The administrator viewing the attention information can examine a schedule for removing the removal target candidate.

In Step S390, the processor 330 may create a schedule for removing the removal target candidate. For example, the processor 330 divides the predetermined area AR into a plurality of zones, and counts the number of removal target candidates for each zone. Then, the processor 330 creates the schedule such that a removal work is more preferentially performed on a zone having more removal target candidates. As another example, the processor 330 grasps a timing of the previous removal work with reference to the management information 360 (the removal history database). Then, the processor 330 may create the schedule such that the removal work is more preferentially performed on a zone having a longer elapsed time from the previous removal work. The processor 330 updates the management information 360 (the removal schedule database) based on the created schedule. The administrator removes the obstacle 30 in accordance with the schedule indicated in the removal schedule database. When the removal of the obstacle 30 is completed, the processor 330 updates the management information 360 (the removal history database).

As described above, using the three-dimensional map data 100 including the specific surrounding space information 120 indicating the specific surrounding space SY makes it possible to detect the removal target candidate with high accuracy. Moreover, detecting the removal target candidate makes it possible to efficiently perform the scheduling of the removal work. Therefore, it is possible to efficiently ensure a favorable environment for the recognition process. That is, it is possible to efficiently manage the environment of the predetermined area AR.

3-2-3. Third Example

A combination of the first example shown in FIG. 14 and the second example shown in FIG. 15 is also possible.

4. Provision of Information to Moving Body

Figure 16:
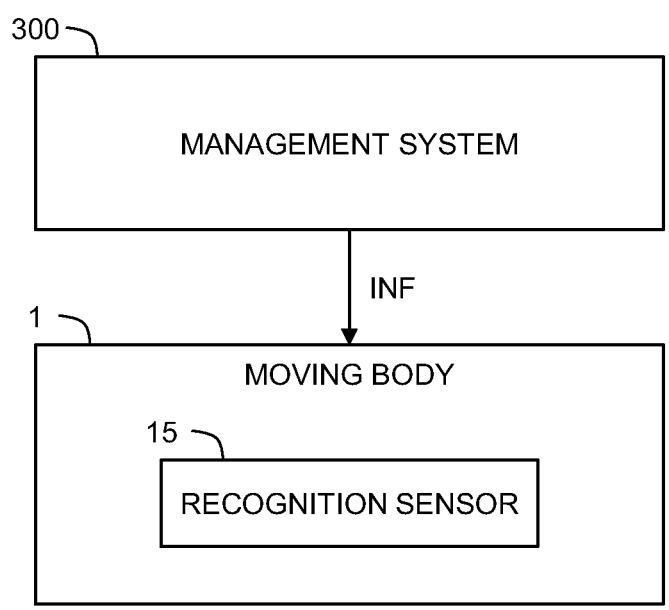
FIG. 16 is a block diagram for explaining information provision to a moving body according to an embodiment of the present disclosure.

FIG. 16 is a block diagram for explaining information provision to the moving body 1. The management system 300 provides notification information INF to the moving body 1. For example, the notification information INF includes the position of the obstacle 30 that inhibits the recognition process. Until the obstacle 30 is removed, the moving body 1 is able to generate a target route so as to avoid the obstacle 30. As a result, it is possible to prevent the moving body 1 from being unable to accurately recognize the recognition target and being stuck.

What is claimed is:

1. A management system for managing an environment of a predetermined area,
the management system comprising:
one or more processors; and
one or more memory devices configured to store three-dimensional map data of the predetermined area, wherein
in the predetermined area, there is a recognition sensor present at a specific position configured to recognize a surrounding situation and a recognition target to be recognized by the recognition sensor present at the specific position,
the three-dimensional map data include specific space information indicating a specific space that is a space between the specific position and the recognition target, and
the one or more processors are configured to:
acquire recognition result information indicating a result of recognition by the recognition sensor present at the specific position;
determine whether or not an object that is not included in the specific space in the three-dimensional map data is included in the specific space in the recognition result information; and
detect, as a removal target, the object that is not included in the specific space in the three-dimensional map data but is included in the specific space in the recognition result information.

2. The management system according to claim 1, wherein the one or more processors are further configured to prohibit detection of an object present outside the specific space as the removal target.

3. The management system according to claim 1, wherein the one or more processors are further configured to notify an administrator of recommendation information that recommends removal of the removal target detected.

4. The management system according to claim 3, wherein the recognition sensor includes a camera,
the recognition result information includes an image captured by the camera, and
the recommendation information includes the image.

5. The management system according to claim 1, wherein the three-dimensional map data further include specific surrounding space information indicating a specific surrounding space around the specific space, and
the one or more processors are further configured to:
determine whether or not an object that is not included in the specific surrounding space in the three-dimensional map data is included in the specific surrounding space in the recognition result information; and
detect, as a removal target candidate, the object that is not included in the specific surrounding space in the three-dimensional map data but is included in the specific surrounding space in the recognition result information.

6. The management system according to claim 5, wherein the one or more processors are further configured to create a schedule for removing the detected removal target candidate at a different timing than the detected removal target or suggest creation of the schedule to an administrator.

7. The management system according to claim 1, wherein the one or more memory devices are further configured to store semantic model information indicating attribute information of each of components constituting the predetermined area, and the one or more processors are further configured to:
  define the recognition target as one of the components in the semantic model information;
  define the specific position as one of the components in the semantic model information;
  define the specific space as one of the components in the semantic model information based on the recognition target and the specific position; and
  generate the three-dimensional map data including the specific space information based on the semantic model information in which the specific space is defined.

8. The management system according to claim 1, wherein the recognition sensor is mounted on a moving body that moves in the predetermined area.

9. A map generation system for generating three-dimensional map data of a predetermined area,
the map generation system comprising:
  one or more processors; and
  one or more memory devices configured to store semantic model information indicating attribute information of each of components constituting the predetermined area, wherein
  in the predetermined area, there is a recognition sensor present at a specific position configured to recognize a surrounding situation and a recognition target to be recognized by the recognition sensor present at the specific position, and
  the one or more processors are configured to:
    define the recognition target as one of the components in the semantic model information;
    define the specific position as one of the components in the semantic model information;
    define a specific space, which is a space between the specific position and the recognition target, as one of the components in the semantic model information based on the recognition target and the specific position; and
    generate the three-dimensional map data including specific space information indicating the specific space based on the semantic model information in which the specific space is defined.

10. The map generation system according to claim 9, wherein
  when a position of the recognition target in the predetermined area is changed, the one or more processors are configured to update definitions of the recognition target, the specific position, and the specific space in the semantic model information, thereby updating the three-dimensional map data.

11. The map generation system according to claim 9, wherein
  the one or more processors are further configured to:
    define a field of view of the recognition sensor present at the specific position as one of the components in the semantic model information; and
    when at least a part of the specific space deviates from the field of view of the recognition sensor present at the specific position, add warning information indicating a shortage of the field of view to the specific space information or notify an administrator of the warning information.

12. A non-transitory computer-readable recording medium on which three-dimensional map data of a predetermined area are recorded, wherein
  in the predetermined area, there is a recognition sensor present at a specific position configured to recognize a surrounding situation and a recognition target to be recognized by the recognition sensor present at the specific position,
  the three-dimensional map data have a data structure including specific space information indicating a specific space that is a space between the specific position and the recognition target,
  recognition result information indicates a result of recognition by the recognition sensor present at the specific position,
  the three-dimensional map data are read by a management system that manages an environment of the predetermined area,
  whether or not an object that is not included in the specific space in the three-dimensional map data is included in the specific space in the recognition result information is determined by the management system, and
  the object that is not included in the specific space in the three-dimensional map data but is included in the specific space in the recognition result information is detected as a removal target by the management system.

* * * * *